US009282131B2

(12) United States Patent
Hosur et al.

(10) Patent No.: US 9,282,131 B2
(45) Date of Patent: Mar. 8, 2016

(54) SYSTEM AND METHOD FOR SPLICING MEDIA FILES

(75) Inventors: Prabhudev I. Hosur, Austin, TX (US);
Cuong T. Nguyen, Austin, TX (US);
Jonathan R. Brickey, Austin, TX (US)

(73) Assignee: Imagine Communications Corp., Frisco, TX (US)

( * ) Notice: Subject to any disclaimer, the term of this patent is extended or adjusted under 35 U.S.C. 154(b) by 461 days.

(21) Appl. No.: 12/690,166

(22) Filed: Jan. 20, 2010

(65) Prior Publication Data
US 2010/0185776 A1 Jul. 22, 2010

Related U.S. Application Data

(60) Provisional application No. 61/145,778, filed on Jan. 20, 2009.

(51) Int. Cl.
*G06F 15/16* (2006.01)
*H04L 29/06* (2006.01)
*H04L 29/08* (2006.01)

(52) U.S. Cl.
CPC ............ *H04L 65/602* (2013.01); *H04L 65/607* (2013.01); *H04L 67/02* (2013.01); *H04L 67/2823* (2013.01); *H04L 69/08* (2013.01)

(58) Field of Classification Search
CPC ... H04L 67/2823; H04L 69/08; H04L 65/602; H04L 65/607; H04L 67/02
USPC ..................................... 709/231, 236; 707/10
See application file for complete search history.

(56) References Cited

U.S. PATENT DOCUMENTS

| 4,509,073 A | 4/1985 | Baran |
| 5,093,718 A | 3/1992 | Hoarty |

(Continued)

FOREIGN PATENT DOCUMENTS

| GB | 2369203 A | 5/2002 |
| WO | 99/07158 | 2/1999 |

(Continued)

OTHER PUBLICATIONS

Chou et al. "Multimedia Over IP and Wireless Networks," Pub. Date: 2007, pp. 453-499.*

(Continued)

*Primary Examiner* — Krista Zele
*Assistant Examiner* — James Forman
(74) *Attorney, Agent, or Firm* — Tarolli, Sundheim, Covell & Tummino LLP

(57) ABSTRACT

A method for processing media content includes receiving a request for media content and, in response, accessing a plurality of source files associated with the requested media content, wherein the source files comprise media content in one or more source formats. The method also includes generating one or more target files based on the plurality of source files. Additionally, the method includes, generating an auxiliary file associated with the target files. The auxiliary file includes a plurality of content records, each content record associated with a portion of the media content in the target. The method further includes, while generating the target files, transmitting the requested media content from the plurality of target files to a client as a seamless media transmission by reading each of the content records in the auxiliary file and transmitting to the client content corresponding to each content record.

18 Claims, 4 Drawing Sheets

(56) References Cited

U.S. PATENT DOCUMENTS

| | | | |
|---|---|---|---|
| 5,220,420 A | 6/1993 | Hoarty | |
| 5,319,455 A | 6/1994 | Hoarty | |
| 5,361,091 A | 11/1994 | Hoarty | |
| 5,412,720 A | 5/1995 | Hoarty | |
| 5,442,700 A | 8/1995 | Snell | |
| 5,485,197 A | 1/1996 | Hoarty | |
| 5,526,034 A | 6/1996 | Hoarty | |
| 5,550,578 A | 8/1996 | Hoarty | |
| 5,557,316 A | 9/1996 | Hoarty | |
| 5,587,734 A | 12/1996 | Lauder | |
| 5,594,507 A | 1/1997 | Hoarty | |
| 5,812,665 A | 9/1998 | Hoarty | |
| 5,883,661 A | 3/1999 | Hoarty | |
| 5,953,506 A | 9/1999 | Kalra | |
| 6,031,584 A * | 2/2000 | Gray | G06T 9/004 375/240.28 |
| 6,034,678 A | 3/2000 | Hoarty | |
| 6,055,315 A | 4/2000 | Doyle | |
| 6,064,377 A | 5/2000 | Hoarty | |
| 6,100,883 A | 8/2000 | Hoarty | |
| 6,177,931 B1 | 1/2001 | Alexander | |
| 6,205,582 B1 | 3/2001 | Hoarty | |
| 6,253,238 B1 | 6/2001 | Lauder | |
| 6,305,020 B1 | 10/2001 | Hoarty | |
| 6,345,279 B1 | 2/2002 | Li | |
| 6,407,680 B1 | 6/2002 | Lai | |
| 6,421,733 B1 * | 7/2002 | Tso et al. | 709/246 |
| 6,490,627 B1 * | 12/2002 | Kalra et al. | 709/231 |
| 6,498,897 B1 | 12/2002 | Nelson | |
| 6,510,513 B1 | 1/2003 | Danieli | |
| 6,593,860 B2 | 7/2003 | Lai | |
| 6,757,429 B2 | 6/2004 | Hu | |
| 6,823,082 B2 | 11/2004 | Hu | |
| 6,888,477 B2 | 5/2005 | Lai | |
| 6,904,168 B1 | 6/2005 | Steinberg | |
| 6,938,157 B2 | 8/2005 | Kaplan | |
| 6,963,972 B1 | 11/2005 | Chang | |
| 6,970,602 B1 | 11/2005 | Smith | |
| 7,088,823 B2 | 8/2006 | Fetkovich | |
| 7,093,277 B2 | 8/2006 | Perlman | |
| 7,734,800 B2 * | 6/2010 | Gupta et al. | 709/231 |
| 2001/0056460 A1 | 12/2001 | Sahota | |
| 2002/0006204 A1 | 1/2002 | England | |
| 2002/0087957 A1 | 7/2002 | Norris | |
| 2002/0120586 A1 | 8/2002 | Masaki | |
| 2002/0129140 A1 | 9/2002 | Peled | |
| 2002/0131496 A1 | 9/2002 | Vasudevan | |
| 2002/0138848 A1 | 9/2002 | Alao | |
| 2002/0172418 A1 | 11/2002 | Hu | |
| 2002/0194227 A1 | 12/2002 | Day | |
| 2003/0004880 A1 | 1/2003 | Banerjee | |
| 2003/0053702 A1 | 3/2003 | Hu | |
| 2003/0061369 A1 * | 3/2003 | Aksu et al. | 709/231 |
| 2003/0105739 A1 | 6/2003 | Essafi | |
| 2003/0158969 A1 | 8/2003 | Gimson | |
| 2003/0185395 A1 | 10/2003 | Lee | |
| 2003/0196206 A1 | 10/2003 | Shusman | |
| 2004/0003117 A1 | 1/2004 | McCoy | |
| 2004/0086039 A1 | 5/2004 | Reynolds | |
| 2004/0111476 A1 | 6/2004 | Trossen | |
| 2004/0133548 A1 | 7/2004 | Fielding | |
| 2004/0133927 A1 | 7/2004 | Sternberg | |
| 2004/0139233 A1 | 7/2004 | Kellerman | |
| 2004/0193648 A1 | 9/2004 | Lai | |
| 2005/0004997 A1 | 1/2005 | Balcisoy | |
| 2005/0060411 A1 | 3/2005 | Coulombe | |
| 2005/0076028 A1 * | 4/2005 | Kimura | H04N 21/235 |
| 2005/0132264 A1 | 6/2005 | Joshi | |
| 2005/0172127 A1 | 8/2005 | Hartung | |
| 2005/0198210 A1 | 9/2005 | Janik | |
| 2005/0213826 A1 | 9/2005 | Neogi | |
| 2005/0265395 A1 | 12/2005 | Kim | |
| 2005/0273598 A1 | 12/2005 | Silverbrook | |
| 2005/0286497 A1 | 12/2005 | Zutaut | |
| 2006/0015649 A1 | 1/2006 | Zutaut | |
| 2006/0026302 A1 | 2/2006 | Bennett | |
| 2006/0117379 A1 | 6/2006 | Bennett | |
| 2006/0136457 A1 | 6/2006 | Park | |
| 2006/0167803 A1 | 7/2006 | Aydar | |
| 2006/0168227 A1 | 7/2006 | Levine | |
| 2006/0168323 A1 | 7/2006 | Kim | |
| 2006/0179472 A1 | 8/2006 | Chang | |
| 2006/0218611 A1 * | 9/2006 | Son et al. | 725/105 |
| 2006/0242318 A1 | 10/2006 | Nettle | |
| 2006/0265657 A1 | 11/2006 | Gilley | |
| 2007/0067390 A1 * | 3/2007 | Agnoli et al. | 709/204 |
| 2007/0067725 A1 | 3/2007 | Cahill | |
| 2007/0124816 A1 | 5/2007 | Abigail | |
| 2007/0162945 A1 | 7/2007 | Mills | |
| 2007/0186005 A1 | 8/2007 | Setlur | |
| 2007/0255659 A1 | 11/2007 | Yen | |
| 2008/0016185 A1 * | 1/2008 | Herberger et al. | 709/219 |
| 2008/0091845 A1 | 4/2008 | Mills | |
| 2008/0114894 A1 | 5/2008 | Deshpande | |
| 2008/0141303 A1 | 6/2008 | Walker | |
| 2008/0195698 A1 | 8/2008 | Stefanovic | |
| 2008/0195761 A1 * | 8/2008 | Jabri et al. | 709/250 |
| 2008/0231480 A1 | 9/2008 | Lai | |
| 2008/0235200 A1 | 9/2008 | Washington | |
| 2009/0013414 A1 | 1/2009 | Washington | |
| 2009/0024626 A1 * | 1/2009 | Takei | 707/9 |
| 2009/0083279 A1 | 3/2009 | Hasek | |
| 2009/0119322 A1 * | 5/2009 | Mills et al. | 707/101 |
| 2009/0164601 A1 * | 6/2009 | Swartz | 709/217 |
| 2009/0232220 A1 * | 9/2009 | Neff et al. | 375/240.21 |
| 2010/0027765 A1 * | 2/2010 | Schultz et al. | 379/52 |
| 2010/0070608 A1 | 3/2010 | Hosur | |
| 2010/0094931 A1 | 4/2010 | Hosur | |

FOREIGN PATENT DOCUMENTS

| | | |
|---|---|---|
| WO | 02/082271 | 10/2002 |
| WO | 03/032136 | 4/2003 |
| WO | 03/073370 | 9/2003 |
| WO | 2004/077790 | 9/2004 |
| WO | 2005/006768 | 1/2005 |
| WO | 2005/046140 | 5/2005 |
| WO | 2006/134310 | 12/2006 |
| WO | 2007/053957 | 5/2007 |
| WO | 2007/063485 | 6/2007 |
| WO | 2009/024926 | 2/2009 |

OTHER PUBLICATIONS

Notification of Transmittal of the International Search Report and the Written Opinion of the International Searching Authority or the Declaration; PCT/US2010/021474; 14 pages, Apr. 26, 2010.

Aylin Kantarci, et al.; "Rate adaptive video streaming under lossy network conditions;" Signal Processing: Image Communication 19; pp. 479-497, Mar. 22, 2004.

Thomas Schierl, et al.; "Mobile Video Transmission Using Scalable Video Coding;" IEEE Transactions on circuits and Systems for Video Technology; vol. 17, No. 9; pp. 1204-1217, Sep. 2007.

U.S. Appl. No. 12/578,773, Office Action dated Dec. 13, 2010, Hosur.

U.S. Appl. No. 12/208,122, Office Action dated Oct. 29, 2010, Hosur.

U.S. Appl. No. 11/772,582, Office Action dated Dec. 21, 2010, Washington.

U.S. Appl. No. 11/772,582, Office Action dated Jun. 28, 2010, Washington.

U.S. Appl. No. 11/688,936, Office Action dated Aug. 7, 2009, Washington.

U.S. Appl. No. 11/328,587, Office Action dated Dec. 10, 2010, Mills.

U.S. Appl. No. 11/328,587, Office Action dated Jul. 8, 2010, Mills.

U.S. Appl. No. 11/328,587, Office Action dated Apr. 16, 2009, Mills.

U.S. Appl. No. 11/328,587, Office Action dated Sep. 19, 2008, Mills.

U.S. Appl. No. 11/549,226, Office Action dated Sep. 30, 2010, Mills.

U.S. Appl. No. 11/549,226, Office Action dated Mar. 1, 2010, Mills.

U.S. Appl. No. 11/549,226, Office Action dated Aug. 3, 2009, Mills.

U.S. Appl. No. 11/549,226, Office Action dated Oct. 13, 2006, Mills.

U.S. Appl. No. 11/936,548, Office Action dated Nov. 7, 2008, Mills.

(56) References Cited

OTHER PUBLICATIONS

U.S. Appl. No. 11/936,548, Office Action dated Jan. 5, 2010, Mills. "Akimbo adds RSS feeds to video-on-demand service," Online Reporter, No. 455, Aug. 6, 2005.
APEC eSecurity Task Group, "Guidelines to Issue Certificates Capable of Being Used in Cross Jurisdictional eCommerce,"*APEC*, Dec. 2004.
Bezoza, Alan et al., "How the Internet Will Disrupt the Long-Term Video Value Chain," Friedman, Billings, Ramsey & Co., Inc. Oct. 6, 2005.
Färber, Nikolaus et al., "Adaptive progressive download based on the MPEG-4 file format," *Journal of Zhejiang University Science* A (Suppl I), 2006.
Kantarci, Aylin et al.; "Rate adaptive video streaming under lousy network conditions;" *Signal Processing: Image Communication 19*, Mar. 22, 2004.
PCT Notification of Transmittal of the International Search Report and the Written Opinion of the International Searching Authority , or the Declaration with attached PCT International Search Report and the Written Opinion of the International Searching Authority in International Application No. PCT/US2008/055079, Sep. 4, 2008.
PCT Notification of Transmittal of the International Search Report and The Written Opinion of the International Searching Authority, or the Declaration with attached International Search Report and the Written Opinion of the International Searching Authority in International Application No. PCT/US2009/060590, Jan. 22, 2010.
PCT Notification of Transmittal of the International Search Report and the Written Opinion of the International Searching Authority , or the Declaration with attached PCT International Search Report and the Written Opinion of the International Searching Authority in International Application No. PCT/US2009/056310, Nov. 17, 2009.
PCT Notification of Transmittal of the International Search Report and the Written Opinion of the International Searching Authority , or the Declaration with attached PCT International Search Report and the Written Opinion of the International Searching Authority in International Application No. PCT/US2010/021474, Apr. 26, 2010.
Schierl, Thomas et al.; "Mobile Video Transmission Using Scalable Video Coding;" *IEEE Transactions on circuits and Systems for Video Technology*; 17:9; pp. 1204-1217, Sep. 2007.
Singer et al., "ISO Media File format specification," *International Organisation for Standardisation ISO/IEC* 14496-1:2001/Amd.3, Oct. 31, 2008.
Xin , Jun et al., "Digital Video Transcoding," *Proceedings of the IEEE*, 93:1, pp. 84-97, Jan. 2005.
Office Action for U.S. Appl. No. 12/208,122, Apr. 19, 2011.
Office Action for U.S. Appl. No. 11/328,587, Apr. 29, 2011.
Office Action for U.S. Appl. No. 11/549,226, Apr. 20, 2011.
Office Action for U.S. Appl. No. 12/578,773, Jun. 28, 2011.
Hosur, Request for Continued Examination Transmittal and Amendment Filed with Request for Continued Examination for U.S. Appl. No. 12/578,773, Dec. 6, 2012.
Office Action for U.S. Appl. No. 12/208,122, Aug. 25, 2010.
Office Action for U.S. Appl. No. 11/772,582, Aug. 29, 2011.
Office Action for U.S. Appl. No. 11/328,587, Oct. 26, 2011.
Office Action for U.S. Appl. No. 12/578,773, Nov. 28, 2011.
Hosur, Response to Election/Restriction Requirement for U.S. Appl. No. 12/208,122, Sep. 20, 2010.
Hosur, Response to Nonfinal Office Action for U.S. Appl. No. 12/208,122, Jan. 31, 2011.
Hosur, Response to Nonfinal Office Action for U.S. Appl. No. 12/208,122, Jul. 19, 2011.
Hosur, Request for Continued Examination Transmittal and Amendment Filed with Request for Continued Examination for U.S. Appl. No. 12/208,122, Nov. 23, 2011.
Hosur, Response to Nonfinal Office Action for U.S. Appl. No. 12/578,773, Apr. 13, 2011.
Hosur, Request for Continued Examination Transmittal and Amendment Filed with Request for Continued Examination for U.S. Appl. No. 12/578,773, Nov. 2, 2011.
Hosur, Response to Nonfinal Office Action for U.S. Appl. No. 12/578,773, Mar. 28, 2012.
USPTO, Final Office Action for U.S. Appl. No. 12/578,773, Aug. 6, 2012.
Non-Final Office Action for U.S. Appl. No. 12/208,122, Nov. 7, 2014.

\* cited by examiner

SYSTEM AND METHOD FOR SPLICING MEDIA FILES

RELATED APPLICATIONS

This application claims the benefit of U.S. Provisional Application No. 61/145,778, filed Jan. 20, 2009, which is incorporated by reference herein in its entirety.

TECHNICAL FIELD

This invention relates, in general, to media-content delivery systems and, more particularly, to a system and method for splicing content from multiple media files together for delivery to a user.

BACKGROUND OF THE INVENTION

Recent years have seen a rapid increase in the amount and variety of media content available for delivery to users of public and private networks such as the Internet. Because this content is delivered from a wide variety of sources in numerous different formats use, hardware and/or software capable of transcoding, transrating, or otherwise modifying media content may be used to convert requested content to an appropriate format for delivery to and playback by clients. However, extensive delays in satisfying a user's request for content can significantly detract from the user's experience. As a result, there is a need for hardware and/or software that can deliver media content to a wide variety of different clients using low-latency techniques for modifying and transmitting the content to the appropriate clients.

SUMMARY OF EXAMPLE EMBODIMENTS

In accordance with the present invention, disadvantages and problems associated with transmitting media content to a user have been substantially reduced or eliminated.

In accordance with one embodiment of the present invention, a method for delivering media content includes receiving a request for media content and, in response to receiving the request, accessing a plurality of source files associated with the requested media content, wherein the source files comprise media content in one or more source formats. The method also includes generating one or more target files based on the plurality of source files. The target files include media content in a target format. Additionally, the method includes, generating an auxiliary file associated with the target files while generating the target files. The auxiliary file includes a plurality of content records. Each content record is associated with a portion of the media content in the target files and indicates a location of the associated portion of the media content in a particular one of the target files. The method further includes, while generating the target files, transmitting the requested media content from the plurality of target files to a client as a seamless media transmission by reading each of the content records in the auxiliary file and transmitting to the client content corresponding to each content record.

Technical advantages of certain embodiments include the ability to transmit content from a sequence of multiple media files to a client in a format appropriate for transmission to and playback by the client. Certain embodiments may facilitate seamless playback of the multiple files by the client. Additionally, particular embodiments may support realtime or near realtime transcoding of one or more of the media files. Furthermore, in particular embodiments, the described techniques may be used to allow advertisements or other content to be inserted into content requested by the user. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and for further features and advantages thereof, reference is now made to the following description taken in conjunction with the accompanying drawings, in which.

DETAILED DESCRIPTION

Figure 1:
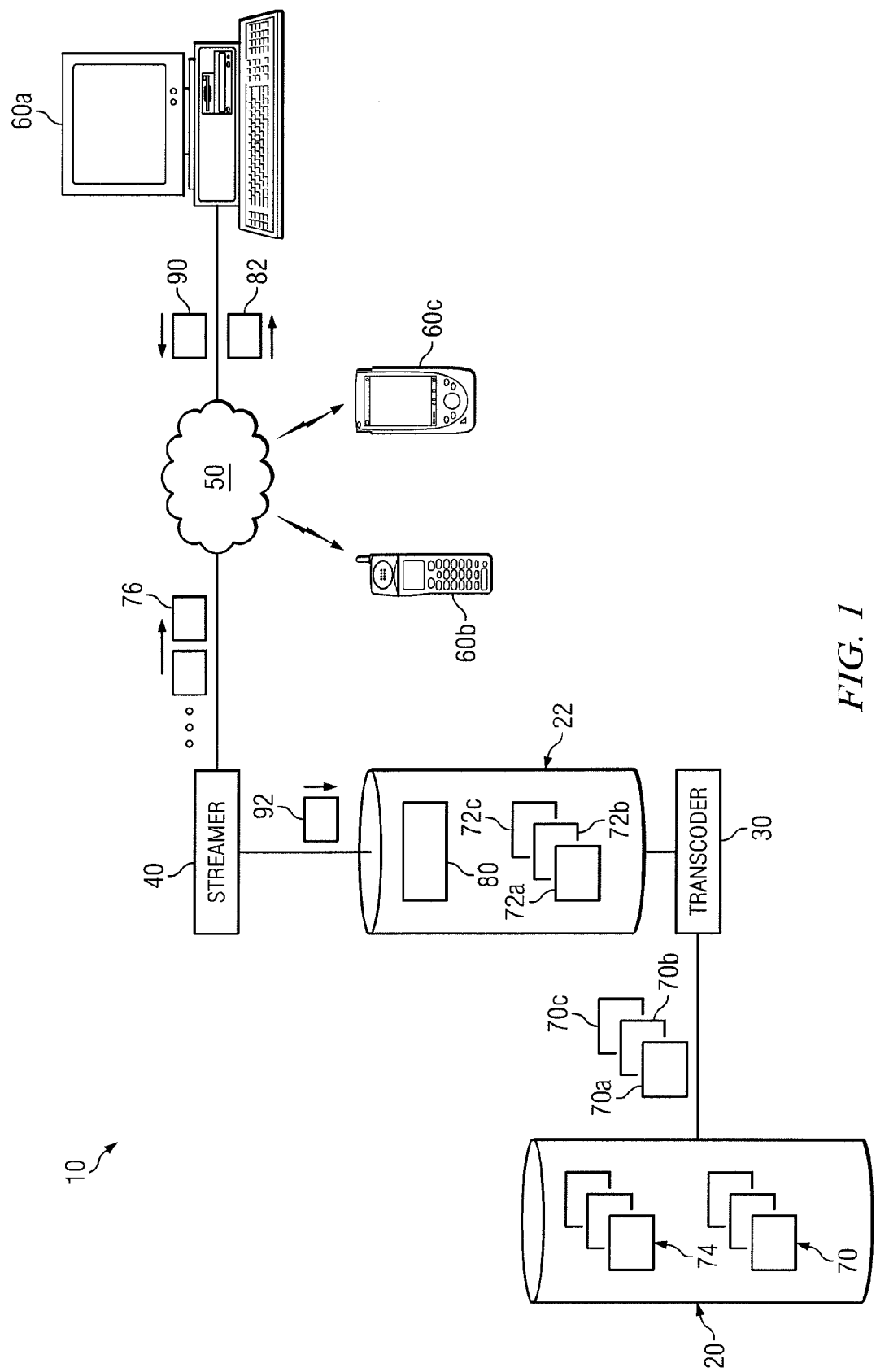
FIG. 1 illustrates a particular embodiment of a content-delivery system capable of splicing content from multiple media files and delivering the spliced content to a requesting client.

FIG. 1 illustrates a particular embodiment of a content-delivery system 10 for transmitting content from media files stored in original content store 20 to clients 60. System 10 includes original content store 20, modified content store 22, transcoder 30, streamer 40, network 50, and clients 60*a-c*. Transcoder 30 retrieves source files 70 requested by clients 60*a-c* and modifies content from the requested source files 70 for delivery to and playback by the requesting clients 60. While this modification is ongoing, streamer 40 streams the modified content to the requesting clients 60.

In certain circumstances, the requested content may be stored in multiple different source files 70. Additionally, it may be desirable to provide advertisements or other content to the requesting client 60 in addition to the requested content. However, if the content is provided to the requesting client 60 as a series of separate files, additional input may be required from the user to initiate playback of each file. Additionally, any measure of the elapsed time may be reset with each file making it difficult to identify specific points in time within the requested content. As a result, particular embodiments of content-delivery system 10 may modify content from multiple source files 70 to an appropriate format and "splice" the modified content from these source files 70 together so that the modified content can be delivered to the requesting client 60 as part of a single, seamless media transmission.

However, in particular embodiments of content-delivery system 10, clients 60 may utilize certain information (referred to generically herein as "media information") that describes the delivered content to configure themselves for receipt and playback of the requested media content. For example, in particular embodiments, content-delivery system 10 may use media information provided by content-delivery system 10 to configure themselves for a frame rate, duration, and other parameters of the content streamed to clients 60 by streamer 40. In particular embodiments, clients 60 may require any such media information to initiate playback of content. Thus, to facilitate playback of multiple different target files 70, transcoder 30 may generate an auxiliary file 80 that includes media information describing multiple source files 70 and/or their content (either before or after any appropriate modification by transcoder 30). Auxiliary file 80 may then be used by streamer 40 to transmit appropriately-modified content from multiple different source files 70 to the requesting client 60 as a single media session, as described further below.

In the example embodiment illustrated in FIG. 1, original content store 20 and modified content store 22 each represent or include any appropriate type of memory devices. Content stores 20 and 22 may each comprise, for example, volatile or non-volatile, local or remote devices suitable for storing data, such as random access memory (RAM) devices, read only memory (ROM) devices, magnetic storage devices, optical storage devices, or any other suitable data storage devices. Additionally, although content stores 20 and 22 are both shown as a single element in system 10, content stores 20 and 22 may each represent a plurality of devices and may be distributed across multiple locations within system 10. For example, in particular embodiments, content stores 20 and 22 may represent a network-attached storage (NAS).

Content in system 10 is stored in various media files, including source files 70, target files 72, and insert files 74. Source files 70, target files 72, insert files 74, and media stream 76 may comprise any suitable form of voice, non-voice audio, animation, and/or video information or data that may be played, displayed or otherwise communicated by clients 60 to users. As discussed further below, the content available on system 10 may, in particular embodiments, have a variety of different characteristics that may determine the types of clients 60 that can utilize the content of the various media files. For example, source files 70, target files 72, insert files 74, and media stream 76 may all be associated with different codecs, bit-rates, resolutions, and/or other characteristics that may effect which clients 60 can utilize the relevant content of source files 70, target files 72, insert files 74, and media stream 76.

Original content store 20 stores source files 70 for delivery to clients 60. In particular embodiments, original content store 20 may also store insert files 74 that transcoder 30 or streamer 40 insert into the content transmitted to the requesting client 60. As noted above, source files 70 and insert files 74 may comprise any appropriate type of content files. Specific examples of source files 70 and insert files 74 include video/multimedia content files such as Moving Picture Experts Group (MPEG), MP4, 3GP, Quicktime, Windows Media Video (WMV), and Audio Video Interleave (AVI) files; audio content files such as Waveform audio (WAV), MPEG-1 Audio Layer 3 (MP3), and/or Windows Media Audio (WMA) files; and/or content files of any other appropriate type or format. In particular embodiments, source files 70 and insert files 74 in original content store 20 may all be stored in a single storage format supported by system 10. Alternatively, original content store 20 may store source files 70 and insert files 74 in a variety of different formats appropriate for a variety of different clients 60. Although shown in FIG. 1 as part of system 10, original content store 20 may represent components external to system 10, such as memory components distributed throughout the Internet. As a result, in particular embodiments, transcoder 30 may be able to retrieve, receive, otherwise access and/or process media files provided by a vast number of content sources available throughout the Internet for delivery to clients 60.

Modified content store 22 stores target files 72 containing content from source files 70 that has been generated, transcoded, or otherwise modified by transcoder 30. In certain embodiments, transcoder 30 may store target files 72 that contain modified content from a particular source file 70 in modified content store 22 while transcoder 30 continues modifying the relevant source file 70. Target files 72 may comprise media content of any appropriate type or format including, but not limited to, those listed above for source files 70. In particular embodiments, target files 72 may be of types or formats (such as 3GP files) that, using conventional streaming techniques, would not be conducive to streaming until transcoder 30 had finished writing to the relevant target files 72. Although referred to here as "files," in certain embodiments, any particular target file 72 stored in modified content store 22 may, at a given point in time, represent a partial file that is not complete according to a type or format associated with the relevant target file 72.

Modified content store 22 may also store auxiliary files 80 generated by transcoder 30 during the process of transcoding media files 30 in modified content store 22. As discussed further below, auxiliary files 80 may be used to facilitate streaming of target files 72. In particular embodiments, modified content store 22 represents storage local or internal to transcoder 30, such as the internal memory of a web server functioning as transcoder 30.

Transcoder 30 retrieves, receives, or otherwise accesses requested content from original content store 20 and modifies requested content in a manner suitable for transmission to and display by the requesting client 60. Depending on the capabilities of the requesting client 60 and the characteristics of the requested source file 70, transcoder 30 may transcode, transrate, adjust the resolution of, and/or otherwise modify characteristics of the source file 70 in any appropriate manner to make the content suitable for transmission to and playback by the requesting client 60. In particular embodiments, transcoder 30 may be capable of transcoding content in real-time or near realtime. Additionally, as described further below, transcoder 30 may also generate auxiliary files 80 that include certain information to allow streamer 40 to stream transcoded content from a particular source file 70 to clients 60 before transcoder 30 has completed transcoding the entire source file 70.

Streamer 40 retrieves, receives, or otherwise accesses target files 72 and auxiliary files 80 to deliver requested content to clients 60. Additionally, in particular embodiments, streamer 40 may interact with clients 60 by, for example, providing information on content available in system 10 or processing requests from clients 60 for delivery of content from source files 70. Streamer 40 may also be responsible for initiating transcoding or otherwise managing the operation of transcoder 30 in modifying content for clients 60.

Although transcoder 30 and streamer 40 are each shown in FIG. 1 as a single component, transcoder 30 and streamer 40 may each represent functionality provided by several separate physical components. Additionally, depending on the relevant configuration of system 10, transcoder 30 and streamer 40 may represent a single physical component, or may alternatively represent separate components. In general, transcoder 30 and streamer 40 may each represent any appropriate combination of software and/or hardware suitable to provide the described functionality. As one specific example, in particular embodiments, transcoder 30 and streamer 40 each represent a separate web server configured to receive and respond to Hypertext Transfer Protocol (HTTP) requests from one another, clients 60, or other elements of system 10.

Network 50 represents any form of communication network supporting circuit-switched, packet-based, and/or any other suitable type of communication. Although shown in FIG. 1 as a single element, communication network may represent one or more separate networks, including all or parts of various different networks that are separated and serve different groups of clients 60. Network 50 may include routers, hubs, switches, gateways, call controllers, and/or any other suitable components. In general, network 50 may comprise any combination of public or private communication equipment such as elements of the public-switched telephone network (PSTN), a global computer network such as the Internet, a local area network (LAN), a wide-area network (WAN), or other appropriate communication equipment.

Additionally, although FIG. 1 illustrates a particular configuration of elements directly connected to network 50, network 50 may, in various embodiments, connect directly or indirectly to and/or interact with any appropriate elements of system 10. For example, although FIG. 1 shows transcoder 30 directly connected to original content store 20 and streamer 40, transcoder 30 may, alternatively connect to either or both of original content store 20 and streamer 40 over network 50. Accordingly, the components of system 10 may be arranged and configured in any appropriate manner to communicate over network 50 and/or over direct connections between the relevant components.

Clients 60 display, play, or otherwise communicate content retrieved from original content store 20 and modified content store 22. In particular embodiments, various clients 60 may be capable of receiving and/or playing media associated with particular file formats, file types, codecs, bit-rates, and/or resolutions, and/or having other appropriate characteristics. Examples of clients 60 may include, but are not limited to, computers, video-enabled telephones, media players (such as, for example, audio- and/or video-capable iPods), televisions, PDAs, cell phones, portable communication devices, and other electronic devices. In general, however, clients 60 may include any appropriate combination of hardware, software, and/or encoded logic suitable to provide the described functionality. For example, in the illustrated embodiment, client 60a represent a computer, client 60b represents a video-enabled cellular telephone, and client 60c represents a portable media device. Clients 60 may couple to network 50 through a dedicated connection (wired or wireless) or may connect to network 50 only as needed to access media content. Although FIG. 1 illustrates, for purposes of example, a particular number and type of clients 60, alternative embodiments of system 10 may include any appropriate number and type of clients 60.

In operation, clients 60 request content contained in source files 70 stored by original content store 20. Because each client 60 may only be capable of receiving and/or playing media content having certain formats, system 10 source files 70 may be transcoded or otherwise modified by transcoder 30 from a source format, such as an original format in which the relevant source file 70 is stored, to a target format appropriate for transmission to and display by a requesting client 60. For purposes of this description and the claims that follow, the "format" of content refers to an encoding, bit-rate, resolution, frame rate, configuration, and/or any other aspect, characteristic, or property of the relevant content that is associated with transmitting the content to or displaying the content with a particular type of client.

Problems may arise in low-latency transmission, however, where a target format is not conducive to transmission or streaming until the corresponding source file 70 is completely transcoded. For example, certain file formats may require data blocks, headers, or other file information that is not written until file transcoding is complete, but that is needed for clients 60 to properly receive, play, or use the requested content. As one example, 3GP files include a structure called a "moov" box that contains information about the content stored in the 3GP file, such as the starting point of the content in the 3GP file, the type of content stored in the file, and the sequence in which the content should be played. The information contained in the "moov" box of a 3GP file is written progressively and is, thus, incomplete while a media file is being written to the 3GP format. Accordingly, for 3GP files, this "moov" information is not complete until the entire 3GP file is written and all 3GP audio and video data is available. As a result, the use of 3GP files may hinder or prevent certain conventional systems from streaming content from a 3GP file that is still being transcoded. Similar or comparable problems may arise with respect to other media file formats as well.

Thus, to facilitate streaming of content from incomplete target files 72 while transcoder 30 is still writing to these target files 72, transcoder 30 may generate auxiliary files 80 as part of responding to media requests from clients 60. Auxiliary files 80 include any suitable data, code, or information that may be used by streamer 40 to deliver portions of the content in a requested target file 72 while transcoding is ongoing. Streamer 40 may transmit information from auxiliary file 80 to clients 60 to allow clients 60 to configure themselves for receipt or playback of the requested content or may otherwise use this information to facilitate transmission and playback of the corresponding target files 72.

In certain embodiments, system 10 may respond to a particular media request by delivering content from multiple different target files 72 to the requesting client 60 as a single media session. As a result, transcoder 30 may generate one or more auxiliary files 80 that facilitate transmission and playback of multiple different target files 72. Auxiliary files 80 may allow streamer 40 to transmit content from target files 72 associated with the media request and/or allow the requesting client 60 to receive and play content from one of the target files 72 associated with the media request while modified content is still being written to that target file 72. Thus, system 10 may reduce the latency associated with delivery of requested content by utilizing auxiliary files 80 to deliver content from target files 72 to clients 60 while one or more of the relevant target files 72 are still being generated. Furthermore, in particular embodiments, the use of auxiliary files 80 may allow clients 60 to seamlessly play back the various target files 72 associated with the media request.

An example of this process, as implemented by a particular embodiment of system 10, is illustrated in FIG. 1. As shown by FIG. 1, a client 60 (here, client 60a) may initiate the delivery process by transmitting a content request 90 to streamer 40 or another appropriate element of system 10, such as a content-management server responsible for interfacing with clients 60. Content request 90 may identify a specific source file 70 or may describe characteristics (using, for example, keywords) of the requested media content. Content request 90 may represent any appropriate message, request, or appropriately structured collection of information requesting delivery of content to the transmitting client 60. For example, in particular embodiments, content request 90 represents a Hypertext Transfer Protocol (HTTP) request that identifies a particular source file 70 stored by original content store 20.

As discussed above, content request 90 may result in content from multiple different files being sent to client 60a. As one example, content request 90 may itself identify several target files 72 or may identify a playlist that references several target files 72 and system 10 may deliver these target files 72 to client 60a in response to content request 90. As another example, content request 90 may identify a particular movie, song, or other media work that is stored by system 10 as multiple separate source files 70. System 10 may deliver content from all of these source files 70 to client 60a in response to content request 90. As yet another example, system 10 may break a requested source file 70 into multiple target files 72 before transmitting content form the requested source file 70 to client 60a to allow advertisements or other content to be inserted into content from the requested source file 70.

In response to client 60a transmitting content request 90, streamer 40 may determine an appropriate target format for the requested content to allow, facilitate, and/or optimize transmission to and playback by the requesting client 60. Streamer 40 may determine the target format based on any appropriate information, considerations, or and/or circumstances. As one example, content request 90 may indicate the appropriate format that the requested content should have for transmission to and/or playback by the requesting client 60. Thus, in particular embodiments, streamer 40 may receive an HTTP request specifying the codec, bit-rate, and/or other parameters for the requested content. As a result, streamer 40 may be able to determine, based on information contained in the HTTP request, the output format and characteristics appropriate for the requested content. As another example, streamer 40 may determine relevant characteristics of the requesting client 60 and select a target format for the requested content based on this information. For example, streamer 40 may identify whether the client is a computer, cellular phone, personal data assistant, or other type of client device. Based on this determination, streamer 40 may determine the format characteristics appropriate for client 60a based on its type. As yet another example, streamer 40 may detect characteristics of the particular network or portion of network 50 that client 60a is communicating over to determine an appropriate target format in which to provide the requested content to client 60a. Thus, in particular embodiments, streamer 40 may determine, based on the fact that content request 90 was received over a certain type of network, an appropriate codec or bit-rate at which to transmit the requested content to client 60a. In general, however, streamer 40 may determine, in any suitable manner and based on input from any appropriate components, the proper target format for the content requested by client 60a.

If the requested source files 70 are stored in original content store 20 in the target format, streamer 40 may access the requested source files 70 in original content store 20 and transmit the requested source files 70 to client 60a in the format in which they are stored. In the illustrated example, system 10 is configured to transmit modified content from target files 72 to clients as part of a media stream 76. In general, however, system 10 may be configured to transmit modified content to clients 60 as a stream, as part of a progressive download, or in any other appropriate manner. Upon receiving any portion of the requested source files 70, client 60a may begin playback of the portion and subsequently received content from the requested source files 70.

However, if one or more of the requested source files 70 are not in the target format, streamer 40 may request that transcoder 30 modify the requested source files 70 to the target format for client 60a. To request this modification, streamer 40 may transmit any appropriate information identifying the appropriate target format for the requested source files 70, specifying the client 60 that transmitted the relevant content request 90, or communicate any other appropriate information to transcoder 30 indicating an appropriate target format for the requested source files 70. Alternatively, in particular embodiments, streamer 40 may communicate such information to a load-balancing server or other element of system 10 responsible for managing the operation of one or more transcoders 30 in system 10.

In the illustrated example, streamer 40 transmits a transcoding request 92 to transcoder 30 identifying the requested source files 70 and the target format for content request 90. Transcoding request 92 may represent any appropriate packet, message, request, or other collection of information requesting that transcoder 30 deliver content from particular source files 70 to streamer 40 in a particular target format. In the illustrated example, transcoding request 92 represents a Hypertext Transfer Protocol (HTTP) request that identifies a plurality of source files 70 stored by original content store 20 and a target format suitable for client 60a.

In response to receiving transcoding request 92, transcoder 30 locates and retrieves the requested source files 70 (here, source files 70a-c) from original content store 20. Transcoder 30 may retrieve, receive, or otherwise access requested source files 70a-c in any appropriate manner. In particular embodiments, original content store 20 includes one or more web servers (and associated memory elements) accessible through the Internet and transcoder 30 communicates with original content store 20 using the HTTP protocol.

After receiving one or more of the requested source files 70a-c, transcoder 30 may begin modifying source files 70a-c according to the target format. As noted above, transcoder 30 may modify requested source files 70a-c by transcoding, transrating, changing the resolution of, and/or otherwise modifying any aspect, characteristic, or property of the content in the requested source file 70a-c. Transcoder 30 writes modified content from source files 70a-c to one or more target files 72 in the target format. In the illustrated example, transcoder 30 writes modified content from each of source files 70a-c to a corresponding target file 72a-c.

As discussed above, while modifying content from source files 70a-c, transcoder 30 generates media information describing the modified content. For example, in particular embodiments, transcoder 30 generates media information for a particular content request 70 that includes session information 82 and an auxiliary file 80. Session information 82 describe parameters or characteristics for a media session in which streamer 40 will transmit the requested content to the requesting client 60 and allow the requesting client 60 to configure itself to receive this media session. Auxiliary files 80 include information that describes the content stored in target files 72 and enable streamer 40 to stream target files 72 to client 60 as part of a single media session. Auxiliary files 80 may include information such as file header information, framerate data, resolution data, bitrate data, a total number of video or audio frames in target files 72, and/or any other appropriate information describing the resulting target files 72. Auxiliary files 80 may also include information for specific portions of target files 72, such as timestamp data, location information, and/or any other appropriate information describing specific portions of the corresponding target files 72. The structure and content of an example auxiliary file 80 is discussed more fully below with respect to FIG. 2.

In the illustrated example, transcoder 30 generates session information 82 in the form of a valid Session Description Protocol (SDP) message describing a media session in which content from target files 72 will be transmitted to client 60a. Transcoder 30 also generates a single auxiliary file 80 (shown as auxiliary file 80a) that includes additional media information describing content in all of the corresponding target files 72a-c. This media information comprises a plurality of records, each associated with a particular portion of the media content (e.g., a particular video or audio frame) in one of the target files 72. These content records each indicate the location of the associated portion of media content within the relevant target file 72 and can be used to access the corresponding target file 72 and retrieve the associated media content.

Additionally, streamer 40 may be configured to transmit content from a plurality of target files 72 to client 60a as a single seamless transmission, such as a media stream. As a result, transcoder 30 and/or streamer 40 may take additional steps to maintain temporal continuity between the multiple target files 72. In particular embodiments, transcoder 30 may include, in auxiliary file 80a, frame-rate information for the video content and sample-rate information for the audio content that will be written to the corresponding target files 72. Streamer 40 may then compute an estimated time-stamp for each video-frame and each audio-frame of the corresponding target files 72 based on the video frame rate and an audio sample rate, respectively, of the transcoded file. Streamer 40 may then use this estimated time-stamp to compute a time-stamp for each of the media frames in the corresponding target files 72.

After transcoder 30 begins generating media information for the corresponding target files 72, streamer 40 may begin communicating this media information to the requesting client 60 or otherwise use this media information to facilitate transmission and playback of the corresponding target files 72. In particular embodiments, streamer 40 may, while modification of the requested source files 70 is still ongoing, utilize the relevant media information. Streamer 40 may also begin to transmit content from target files 72 to the requesting client 60 as part of media stream 76.

In the illustrated example, once transcoder 30 has formed session information 82 (representing an SDP message in this example), streamer 40 transmits session information 82 to client 60a via a Real-Time Streaming Protocol (RTSP) link with client 60a. Based on session information 82, client 60a configures itself for receipt and playback of content in accordance with the description provided by session information 82. After transmitting session information 82, in the illustrated example, streamer 40 reads a first record from auxiliary file 80 to identify a starting location for content within target file 72a, retrieves a specified amount of content (e.g., a particular number of bytes) from target file 72a at this starting location, and transmits the retrieved content to client 60a. Streamer 40 may repeat this process for subsequent records of auxiliary file 80 and incrementally transmit all of modified content from target file 72a to client 60a. Because transcoder 30 begins generating auxiliary file 80a, in this example, while modifying the first requested source file 70a, streamer 40 can begin transmitting modified content from target file 72a before transcoder 30 has completed modifying any of source files 70a-c.

As the requesting client 60 begins receiving modified content from a first target file 72 from streamer 40, client 60a begins playing the requested content in accordance with any session information 82 received from streamer 40. As streamer 40 continues transmitting content from subsequent target files 72, client 60a plays back content from these addition target files 72 as well, until streamer 40 has finished transmitting all of the target files 72 associated with the requested source files 70.

In addition, transcoder 30 or streamer 40 may take further steps to ensure that modified content is written to target files 72 and/or transmitted to clients *** in conformance with session information 82 transmitted to clients 60. For example, while transmitting content from target files 72, streamer 40 may take steps to maintain temporal continuity of the media transmission. Thus, streamer 40 may, in particular embodiments, calculate a time-stamp for each frame of every target file 72a-c based on a frame rate associated with the target format and a number of frames that were dropped by transcoder 30 while modifying content for target files 72a-c. Streamer 40 may then write the calculated timestamp to the relevant frame, overwriting any existing timestamp, before transmitting the frame to client 60a. By calculating timestamps for transmitted frames and modifying the frames accordingly, streamer 40 may be able to maintain temporal consistency between the frames of multiple different target files 72 and, as a result, may be able to transmit multiple target files 72 to client 60a as part of a single seamless media stream.

In particular embodiments, transcoder 30 or streamer 40 may be further configured to transmit additional content to clients 60 apart form the content requested from source files 70. Specifically, in particular embodiments, transcoder 30 and streamer 40 may be configured to transmit one or more insert files 74 to the requesting client 60 as part of transmitting the requested content. Insert files 74 may include any suitable voice, non-voice audio, animation, and/or video information or data that may be transmitted to the requesting client 60 as part of the same media transmission as the requested content. Examples of the media content that may be included in insert files 74 include, but are not limited, to advertisements to be played as part of the requested content, copyright notices to be played in advance of the requested content, and voice annotations offering explanation or analysis of the requested content.

In embodiments of system 10 that support the use of insert files 74, streamer 40, transcoder 30, or other appropriate elements of system 10 may, in response to content request 90, determine whether content from any insert files 74 should be added to the requested content and/or identify appropriate insert files 74 to add to the request content. The appropriate elements may make these determinations based on any suitable characteristics, factors, or considerations.

In particular embodiments, transcoder 30 may determine based on the specific source files 70 identified by or associated with content request 90 whether to include any insert files 74 with the requested content. For example, streamer 40 may determine based on a copyright status of requested source files 70 whether to include a copyright notice or based on a rating for requested source files 70 whether to include a parental advisory. In alternative embodiments, streamer 40 may insert one or more of a group of insert files 74 into every set of source files 70 requested by clients 60. For example, streamer 40 may add an advertisement to the content requested by every content request 90 received by streamer 40. Furthermore, in particular embodiments, streamer 40 may determine based on the client 60 from which streamer 40 received content request 90 whether to include insert files 74 and/or what insert files 74 to includes. For example, streamer 40 may determine based on whether the requesting client 60 is associated with a paying subscriber whether to insert commercials in the requested content.

If streamer 40 determines that insert files 74 are to be included in the requested content, streamer 40 identifies the relevant insert files 74 to transcoder 30 (e.g., as part of transcoding request 92) and provides additional information to be used by transcoder 30 in inserting insert files 74 into the requested content, such as the order in which content from the various insert files 74 and target files 72 should be transmitted to the requesting client 60. If transcoder 30 determines that the identified insert files 74 are not currently in the target format, transcoder 30 may modify the identified insert files 74 to the target format and operation may proceed as described above with transcoder 30 treating the identified insert files 74 in a similar manner to any of the requested source files 70.

If, instead, transcoder 30 determines that any of the identified insert files 74 are already in the target format, transcoder 30 may still generate an auxiliary file 80 for the relevant insert file 74 to facilitate seamless playback of that insert file 74 along with any requested content. Alternatively, if transcoder 30 determines that a particular insert file 74 is already in the target format, streamer 40 may access the insert file 74 itself to read the media information streamer 40 uses to transmit insert file 74 to the requesting client 60a. In such embodiments, transcoder 30 may not generate an auxiliary file 80 for the relevant insert file 74.

Because streamer 40 can access and utilize media information while transcoder 30 is still modifying content from source files 70, in particular embodiments of system 10, streamer 40 may be capable of transmitting modified content from target files 72 to clients 60, and clients 60 may be capable of playing the modified content, before transcoder 30 has finished creating the target files 72 corresponding to the requested source files 70 As a result, system 10 may provide low-latency delivery of content from multiple source files 70 in multiple different target formats. Additionally, in particular embodiments, streamer 40 and transcoder 30 may take steps to maintain temporal continuity between frames of the various target files 72 transmitted to requesting clients 60. This may allow system 10 to deliver content from multiple different source files 70 as a single seamless media transmission. Consequently, particular embodiments of system 10 may provide numerous operational benefits. Specific embodiments, however, may provide none, some, or all of these benefits.

Figure 2:
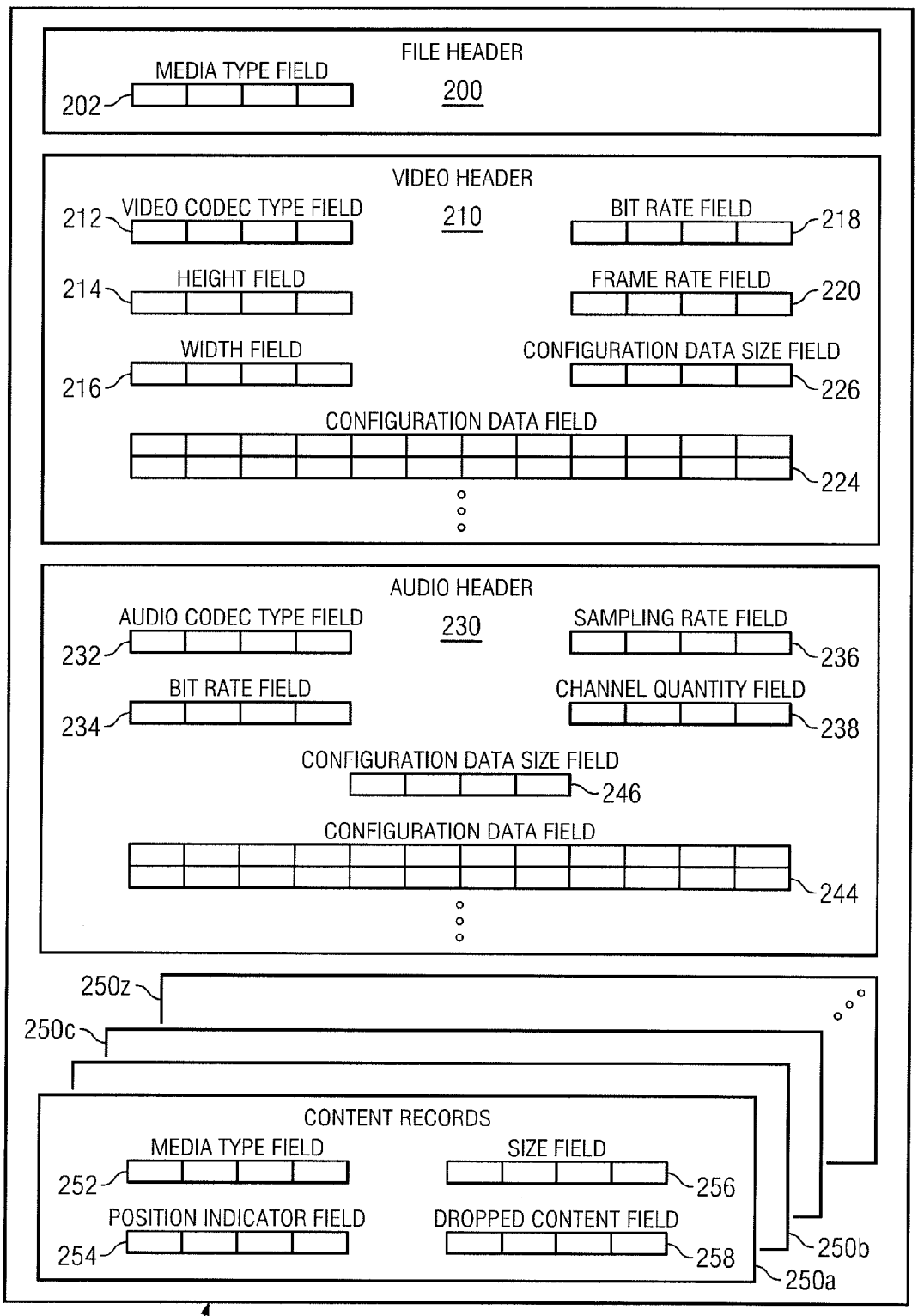
FIG. 2 illustrates an auxiliary file that may be utilized to facilitate transmission of content in particular embodiments of the systems shown in FIG. 1.

FIG. 2 is a diagram illustrating in greater detail the contents and structure of an auxiliary file 80 that may be generated by particular embodiments of transcoder 30 when completing the content-delivery process described with respect to FIG. 1. As discussed above, transcoder 30 may generate auxiliary files 80 while transcoding content from requested source file 70 to create the corresponding target file 72. Streamer 40 may then access auxiliary files 80 while transcoding is still ongoing and utilize the information in the accessed auxiliary files 80 to facilitate transmission of media content from the requested media files 72 before the relevant transcoder 30 has finished modifying content from the requested source files 70 and/or creating the corresponding target files 72.

In the illustrated embodiment, auxiliary file 80 includes a file header 200, one or more media headers (including a video header 210 and an audio header 230), and one or more content records 250. While FIG. 2 and the description below describe a particular embodiment of auxiliary file 80 that includes certain information structured in a particular manner, auxiliary files 80 may include other appropriate information and/or be structured in a different manner than that described. In general, auxiliary files 80 may include any data appropriate to facilitate transmission of media content from target files 72 while transcoder 30 is still storing modified content in the relevant files. As a result, alternative embodiments of system 10 may generate auxiliary files 80 having some, none, or all of the elements described below and/or having elements in addition to those described below.

In the example auxiliary file 80 shown in FIG. 2, file header 200 holds general information relating to the media included in the corresponding target file 72 described by auxiliary file 80. As one example, in particular embodiments, this general information may include a media types field 202 identifying one or more media types for the modified media being written to the corresponding target file 72. For example, the illustrated auxiliary file 80 includes a media types field 202 that stores a four-byte value indicating the various media types included in the corresponding target file 72. If target file 72 includes only audio content, transcoder 30 may store a value of "1" in the media types field 202. If, instead, the corresponding target file 72 includes only video content or includes both audio and video content, then transcoder 30 may store a value of "2" or a value of "3," respectively, in media types field 202 of the illustrated auxiliary file 80.

Data in the media headers, such as video header 210 and audio header 230, is used by streamer 40 to determine various properties of the different types of media included in the corresponding target files 72. Each media header may include information specific to the content of that type in the corresponding target file 72. For example, in the illustrated auxiliary file 80, video header 210 holds information regarding video content in the corresponding target file 72 such as, for example, a video codec type, a content size, a bit rate, and a frame rate. In the illustrated auxiliary file 80, this data is stored in a video codec type field 212, multiple size fields (including a height field 214 and a width field 216), a bit rate field 218, and a frame rate field 220, respectively. In particular embodiments, video codec type field 212, height field 214, width field 216, bit rate field 218, and frame rate field 220 each store a four-byte value holding the relevant data.

Audio header 230 may include information similar to video header 210 but relating to audio information in the corresponding target files 72. For example, audio header 230 may include information such as an audio codec type, a bit rate, a sampling rate, and a number of audio channels encoded in the audio content of the corresponding target files 72. In the illustrated auxiliary file 80, this data is stored in audio codec type field 232, bit rate field 234, sampling rate field 236, and channel quantity field 238, respectively. In particular embodiments, audio codec type field 232, bit rate field 234, sampling rate field 236, and channel quantity field 238 each store a four-byte value indicating the relevant data.

Additionally, certain target formats may utilize configuration information that is provided to streamer 40 to allow streamer 40 to transmit content from the corresponding target files 72 and/or to the requesting client 60 to allow the requesting client 60 to receive or play content from the relevant target files 72. For example, in particular embodiments, if the relevant target file 72 represents a 3GP file, streamer 40 may utilize session information, such as a session description protocol (SDP) file to properly stream media content from the 3GP file to the requesting client 60. This SDP file may contain a specific type of configuration information, such as a configuration ("config") string, defining features of the encoded video and/or audio stream contained in the corresponding target file 72. This configuration string may be used by one or both of streamer 40 and the requesting client 60 to properly configure themselves and/or the communication session over which content from the relevant target file 72 will be transmitted.

As a result, in certain embodiments, delays in transmitting modified content from target files 72 may be avoided by including configuration data in a configuration data field 224 of video header 210 and/or a configuration data field 244 of audio header 230. In particular embodiments, the amount of information stored in these fields may vary, and as a result, the value stored in the field may be padded to bring the amount of data up to a particular size. For example, in particular embodiments, configuration information stored in configuration data field 224 or 244 is padded so that 108 bytes of data are stored in these fields. The size of the actual configuration data stored in configuration data fields 224 and 244 may then be stored in a configuration data size field 226 and 246, respectively.

Configuration data field 224 of video header 210 and configuration data field 244 of audio header 230 may store any appropriate information to be utilized to configure streamer 40, the requesting client 60, and/or the transmission session used to transmit content from the corresponding target files 72 to the requesting client 60. For example, in certain embodiments, transcoder 30 may generate a config string from video or audio media in the corresponding target files 72 during transcoding of the relevant media and store the generated config string within the appropriate configuration data field 224 or 244 of auxiliary file 80. Utilizing this config string, streamer 40 may then initiate an RTSP session with the requesting client 60 to transmit content from the relevant target files 72.

Content records 250 include information regarding the structure and contents of the corresponding target files 72. Auxiliary files 80 may include multiple content records 250, each associated with a different portion of the content in target files 72. As noted above, these different content portions of the corresponding target files 72 may each represent a discrete portion of content (e.g., an individual frame or a predetermined number of frames) or arbitrarily-sized portions (e.g., a five-second portion of video data or a kilobyte-sized portion of audio data). In particular embodiments, each audio frame and each video frame in target files 72 has a corresponding content record 250 in auxiliary file 80.

Content records 250 may each include any appropriate information structured in any appropriate manner to allow streamer 40 to access the portion of the corresponding target files 72 associated with that content record 250 and transmit the associated portion to the requesting client 60. For purposes of illustration, the example content records 250 shown in FIG. 2 each include a media type field 252 indicating a type of content associated with the relevant content record 250 (e.g., Audio-1, Video-2), a position indicator field 254 indicating the location of the associated content portion in the corresponding target file 72, a size field 256 indicating the size of the associated content portion, and a dropped content field 258 indicating an amount of content (e.g., a number of frames) dropped during transcoding of the associated portion of media (or dropped in between the transcoding of the associated portion and the immediately preceding or succeeding portion). Additionally, to mark the end of the content records 250 for the corresponding media session, auxiliary file 80 may include an end-of-file record (shown in FIG. 2 as "content record 250z"), in which media type field 252 is set as "end-of-file" and other fields are set to zero.

Thus, in particular embodiments, when retrieving content from the corresponding target file 72 for transmission to the requesting client 60, streamer 40 may access a first content record 250 of auxiliary file 80 to determine a location of the modified content in a first target file 72 associated with the first content record 250. In particular, streamer 40 may access the associated content portion by reading from a location within this first file 72 (e.g., as measured by a number of bytes from the beginning of the corresponding target file 72) based on the position indicator field 254 of the first content record 250. Streamer 40 may then retrieve the associated portion of content by reading a quantity of data determined based on the size field 256 of the associated content record 250 and transmit the associated portion to the requesting client 60. Streamer 40 may then read another content record 250 and repeat the process. Streamer 40 may continue this process on content records 250 associated with additional target files 72 after streaming all the content associated with the first target file 72 until streaming content from all target files 72 associated with the relevant content request 90.

Additionally, content records 250 may also include dropped content field 258 storing information regarding an amount of content dropped during transcoding. This information may allow streamer 40 to transmit portions of a target file 72 with proper timing and synchronization, as discussed above with respect to FIG. 1. For example, in particular embodiments, each content record 250 is associated with a particular video frame in the corresponding target file 72, and the dropped content field 258 for a particular video frame indicates a number of video frames dropped between transcoding of that particular video frame and the transcoding of the immediately preceding video frame in the relevant target file 72. In such embodiments, streamer 40 may then utilize information in the dropped content field 258 of each content record 250 to increment timestamps for the associated video frames when transmitting to the requesting client 60. This may allow streamer 40 and/or the requesting client 60 to maintain audio-video synchronization during streaming of the requested content.

Figure 3:
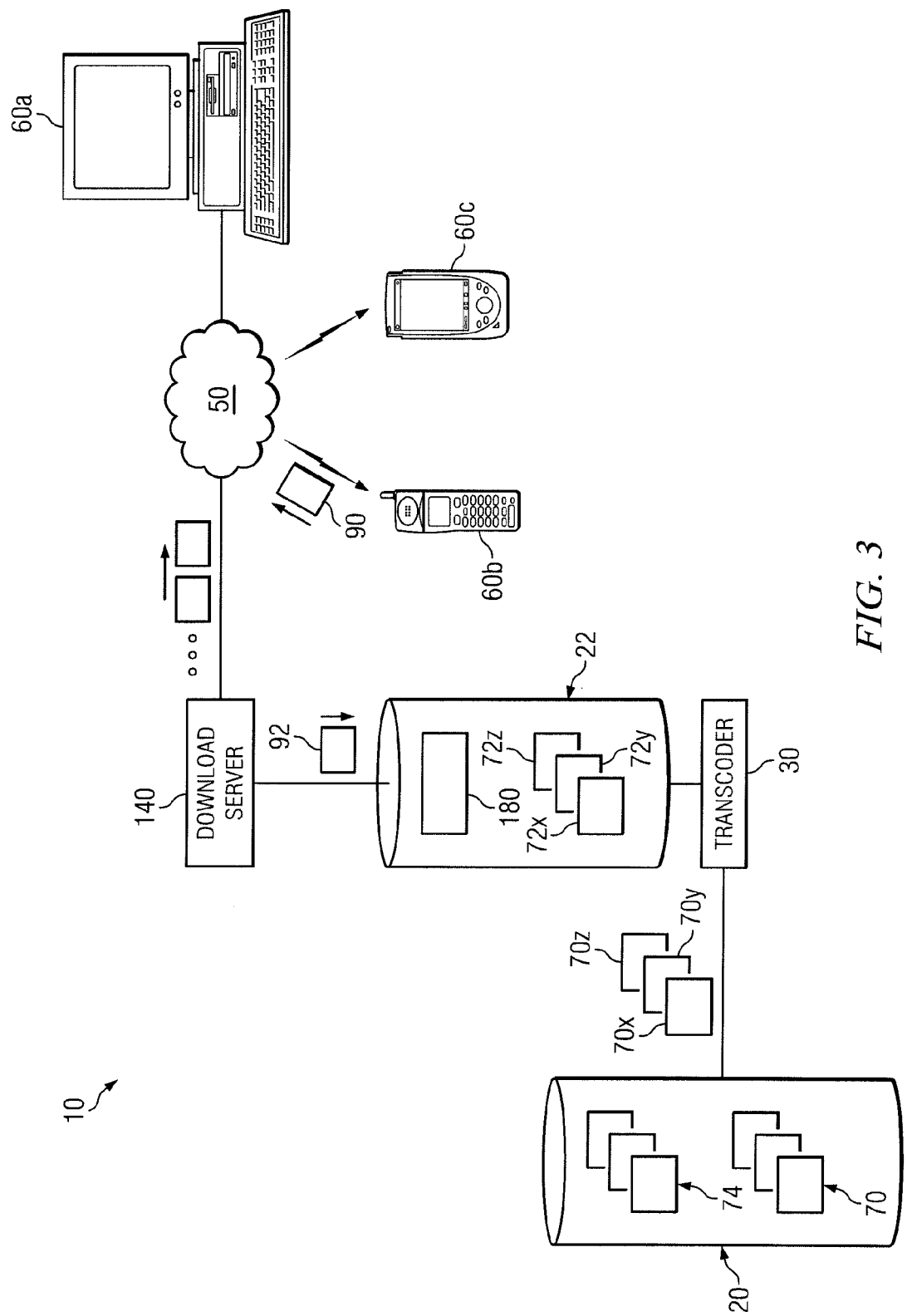
FIG. 3 illustrates an alternative embodiment of the content-delivery system shown in FIG. 1.

FIG. 3 illustrates a content-delivery system 210 according to an alternative embodiment of the present invention in which streamer 40 is replaced by download server 140. In the illustrated embodiment, download server 140 transmits media content from target files 72 to clients 60 as progressive downloads. The use of progressive downloading may allow clients 60 to receive and play content in formats that are not conducive to streaming and formats for which packetization is not standardized. Thus, in particular embodiments, such as the one shown in FIG. 3, streamer 40 may be replaced or supplemented by download server 140.

Download server 140 supports transmission of requested content to clients 60 as progressive downloads. In particular embodiments, download server 140 delivers content from multiple files to a requesting client 60 as part of a single, seamless transmission without any interaction required by the user in between playback of the requested files. As with streamer 40 of system 10 in FIG. 1, download server 140 may additionally be responsible for processing requests for content from clients 60 and/or for managing the operation of transcoder 30. Download server 140 may represent any appropriate combination of hardware and/or software suitable to provide the described functionality. Although shown as a separate element from transcoder 30, in particular embodiments, transcoder 30 and download server 140 may represent a single physical component.

In operation, download server 140 receives a request from a requesting client 60 and initiates the retrieval of source files 70 containing media content requested by the requesting client 60. In particular embodiments, this may occur in a similar fashion to that described above with respect to FIG. 1. For example, in the illustrated embodiment, client 60b initiates the delivery process by transmitting content request 90 to download server 140. In response to receiving content request 90, download server 140 determines a target format for the requested content. Additionally, download server 140 may, in particular embodiments, determine whether the requested content is already available in the target format (e.g., in one or more files stored in original content store 20). If download server 140 determines that the requested content is already available in system 210 in the target format, download server 140 may begin transmitting the requested content to client 60b as part of a progressive download or another suitable form of transmission.

If, instead, download server 140 determines that the requested content is not available in the target format or otherwise determines that modification of the requested content is appropriate, download server 140 transmits a transcoding request 92 to transcoder 30 or to other appropriate components of system 210 to initiate modification of the requested content to the target format. Transcoder 30 may then identify one or more source files 70 containing the requested content and access content in these files to generate a single target file 72 appropriate for transmission to and playback by client 60b.

As part of this process, transcoder 30 may generate media information 180 describing the target file 72 to be created. Media information 180 describes the media content stored by the corresponding target file 72. Clients 60 may use media information 180 associated with the corresponding target file 72 to configure themselves to receive this target file 72, request the contents of the corresponding target file 72, and/or otherwise facilitate receipt and playback of requested media content. As noted above, examples of media information 180 may include, but are not limited to, a file size frame rate, or time duration for the resulting target file 72 and/or frame sizes, media types, or time stamps of individual portions of the media content in target file 72. Client 60b may use the transmitted media information 180 to prepare a media player for playback and to begin requesting blocks of content from the target file 72 being transcoded by transcoder 30.

As discussed above with respect to FIG. 1, transcoder 30 may be able, when modifying certain types of source files 70, to extract existing parameters directly from these source files 70 and generate media information 180 for the corresponding target file 72 based on this data. For example, for source files 70 that have the relevant parameters located at the beginning of the file (such as MP4, 3GP, and Quicktime files), transcoder may be able to extract this data from each of the requested source files 70 and generate media information 180 based on the extracted data. Thus, transcoder 30 may be able, at the beginning of the transcoding process, to access all the relevant parameters to generate media information 180 for such files.

When modifying other types of source files 70, however, transcoder 30 may be unable to access all the relevant parameters in the relevant source files 70 at the start of transcoding. For example, some types of media files (such as FLV, Audio Video Interleave (AVI), and MPEG-1 files) have relevant parameters interspersed with content throughout the file. As a result, transcoder 30 may be unable to access the data that transcoder 30 would otherwise use to generate media information 180 for the corresponding target file 72. Because the requesting client 60 may expect or require media information 180 for any resulting target file 72 before the requesting client 60 can begin downloading and/or playing content from the relevant target file 72, transcoder 30 may estimate certain properties of the requested source files 70 to generate media information 180 for the corresponding target file 72.

In the example illustrated by FIG. 3, source files 70x-z are assumed to have media parameters necessary to generate media information 180 interspersed with media content throughout the relevant files. As a result, when transcoder 30 begins transcoding source files 70x-z, transcoder 30 may be unable to access these parameters in any of source files 70x-z without reading through the entirety of each of source files 70x-z. Consequently, transcoder 30 may generate media information 180 for target file 72z using data provided by client 60b (e.g., in content request 90), information available at the beginning of source files 70x-z, parameters estimated by transcoder 30, and/or any other appropriate information available to transcoder 30.

For example, in particular embodiments, part of the media information 180 created for target file 72z is dependent on the target format and rate for the requested content. As a result, transcoder 30 may copy such information as the frame rate, the duration, and the types of audio and video codecs utilized by the file directly from content request 90 to media information 180. Additionally, transcoder 30 may use information in content request 90 to determine other fields of media information 180 for target file 72z. For example, transcoder 30 may calculate the total number of frames in each of source files 70x-z by determining a frame rate for the relevant target format and multiplying this frame rate by the duration of the requested content. Transcoder 30 may then write this total number of frames to media information 180.

Additionally, transcoder 30 may estimate parameters not available at the start of transcoding. For example, in particular embodiments, transcoder 30 utilizes a-priori estimation techniques to estimate fields in media information 180 such as time-stamps and frame sizes for audio and video frames based on parameters of relevant coding formats, such as a bit rate, frame rate, sample rate, I-frame interval, and total number of media frames; and to estimate the interleaving format of audio and video frames in the target format.

In particular embodiments, transcoder 30 may start this process by modeling the bits-per-frame versus encoder parameter setting characteristics. For a given video or audio encoding format and its corresponding encoding parameter settings, the output of transcoder 30 may be characterized to determine the minimum, maximum, and average level of bits-per-frame for given encoder parameter settings. Based on this characterization, transcoder 30 may model frame sizes in terms of bits-per-frame as a function of encoding bit rate, frame rate/sample rate, temporal location of the frame, resolution, and/or any other appropriate characteristic or factor. The frame size of the resulting target file 72 may then be estimated based upon this model. For video media, transcoder 30 may determine the frequency of occurrence of I-frames in a bit stream based on the encoder parameter settings and may estimate the frame size of I-frames based on this frequency. Furthermore, transcoder 30 may calculate the time stamp difference between two consecutive frames based on the frame rate using the following formula: (time stamp difference between two consecutive frames)=1/(frame rate). Using this formula, transcoder 30 can then determine the time stamp for each frame as follows: Time stamp of current frame=time stamp of immediately previous frame+time stamp difference between consecutive frames. Transcoder 30 may also determine an interleaving order for different types of media data in target file 72z. For example, transcoder 30 may determine that a predetermined amount of video content will be written to target file 72z for a given amount of audio content. Transcoder 30 may determine this order based on constraints of the target format and/or other appropriate considerations.

Based on the time stamp for each frame, the frame size, and an estimate of the interleaving format of audio and video frames in the media, transcoder 30 can then determine the estimated location of each individual audio and video frame in target file 72z to be generated by transcoder 30. Transcoder may generate a single set of media information 180 containing the estimated location of every media frame contained in target file 72z and other appropriate data required or expected by client 60b. Transcoder 30 may then transmit media information 180 for target file 72z to download server 140 for subsequent transmission to client 60b.

After estimating media information 180 for use by client 60b, transcoder 30 may begin modifying content from a first source file 70 (here, source file 70x) from the source format to the target format. Transcoder 30 then writes modified content from source file 70x to a target file 72 (here, target file 72z) in modified content store 22. After modifying and writing all of the content from the first source file 70x to target file 72z, transcoder 30 repeats the process for remaining source files 70, modifying content from source files 70y and 70z and writing the modified content to target file 72z.

Additionally, because media information 180 generated by transcoder 30 will be used by client 60b to request content from target files 72, transcoder 30 may use media information 180 to determine how content should be written to target file 72. Thus, in particular embodiments, transcoder 30 may pad or truncate data to be written into frames in target file 72z to ensure that such frames are written to conform to the parameters transmitted to client 60b as part of media information 180. In particular embodiments that utilize end-of-frame markers (e.g., ID_END in case of Advanced Audio Coding (AAC)), this may involve filling a frame with dummy (e.g., fill_elements in AAC) or zero-valued bits between the last bit of content data and the end-of-frame marker in the relevant frame.

After client 60b receives media information 180 from transcoder 30, client 60b may request content from target file 72z based on the received media information 180. For example, in particular embodiments, client 60b may initiate a progressive download of target file 72z by transmitting an HTTP "GET" request that has a range field identifying a particular portion of target file 72z (such as a particular set of audio and video frames) determined by client 60b based on the received media information 180. Download server 140 may then transmit the first requested portion of target file 72z to client 60b, and client 60b may initiate playback of target file 72z. In particular embodiments, client 60b may be able to begin playback of content from target file 72z before transcoder 30 has finished writing all of the modified media to target file 72z. Client 60b may continue requesting and playing content from target file 72z until client 60b has received and played all of the content from target file 72z.

Although FIG. 3 illustrates an example in which none of the requested source files 70x-z are stored in the target format, in certain circumstances, one or more source files 70 requested by a particular content request 90 may already be stored in the appropriate target format. As a result, particular embodiments of system 210 may support the downloading of both transcoded and unmodified content as part of a single progressive download. Additionally, in particular embodiments, source files 70 to be modified may include both files that have the data used to generate media information 180 segregated in a header at the beginning of the relevant file and files that have the data used to generate media information 180 intermixed with content throughout the relevant file. As a result, transcoder 30 may combine data from multiple different types of source files 70 to generate media information 180 for target files 72 having a target format in which all media information 180 is stored in a header at the beginning of the relevant target file 72 before writing the created media information 180 to the relevant target file 72. Furthermore, under certain circumstances transcoder 30 may generate media information 180 using a mix of existing parameters extracted from source files 70 and estimated parameters generated as described above.

Furthermore, in particular embodiments, transcoder 30 may be configured to add insert files 74 to any source files 70 requested by a particular content request 90 in a similar manner to that described above with respect to the streaming example of FIG. 1. In such embodiments, transcoder 30 may utilize parameters for insert files 74 along with those for requested source files 70 when generating media information 180. By doing so, transcoder 30 may splice content from insert files 74 with content from requested source files 70 so that requested source files 180 and insert files 74 will be played by a requesting client 60 as a single, seamless media session.

Thus, by generating a single set of media information 180 that describes content from multiple source files 70 and/or insert files 74, transcoder 30 may permit a requesting client 60 to retrieve and play appropriately-formatted content from multiple different files as a seamless progressive download. Additionally, by estimating file characteristics used to generate media information 180 instead of waiting until transcoding of the relevant source files 70 has been completed, particular embodiments of system 210 may permit clients 60 to initiate play back of requested source files 70 before such files have been fully transcoded. Thus, particular embodiments of system 210 may provide numerous operational benefits. Specific embodiments, however, may provide none, some, or all of these benefits.

Figure 4:
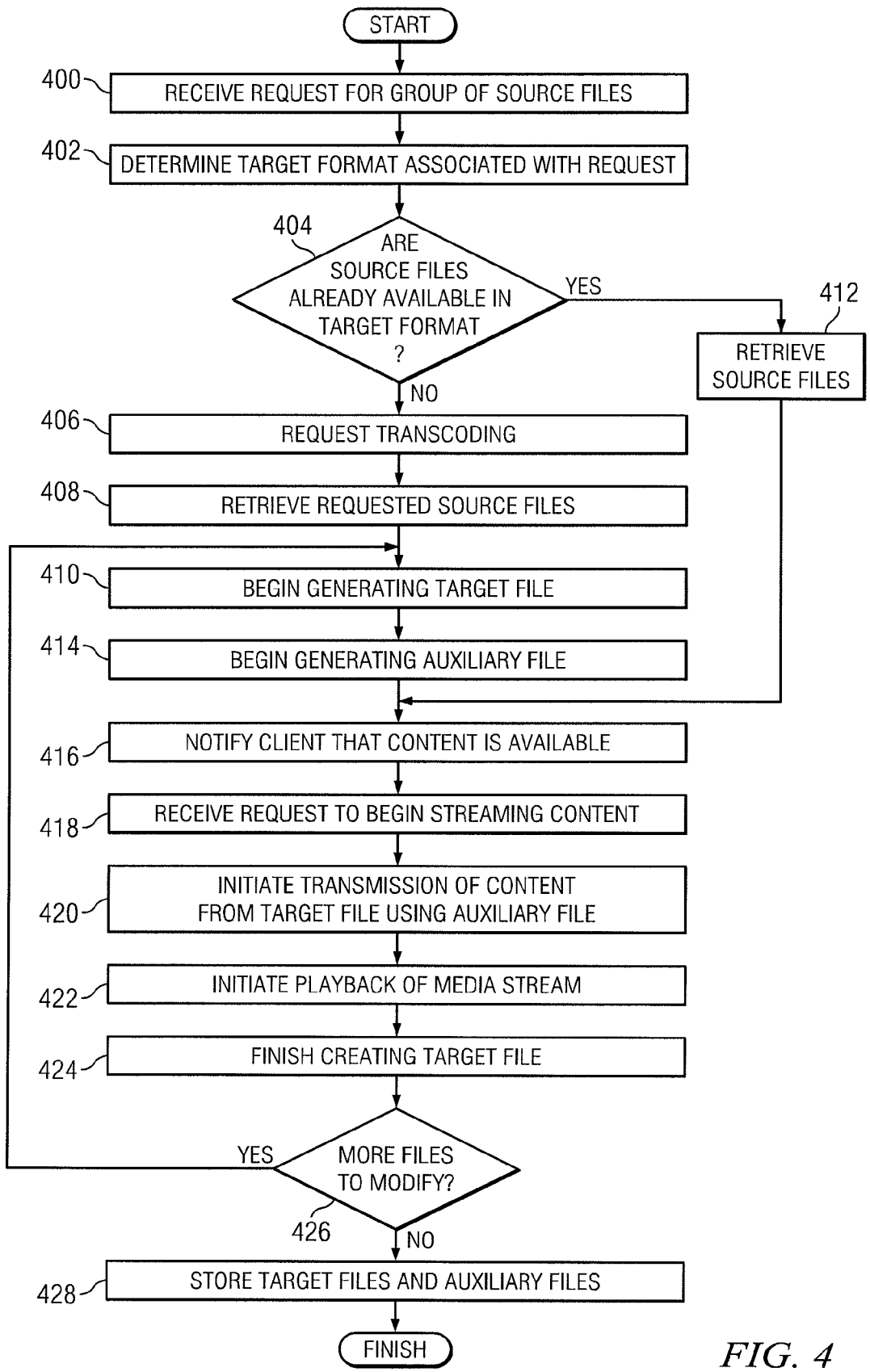
FIG. 4 is a flowchart detailing an example operation of a system for managing media in accordance with certain embodiments.

FIG. 4 is a flowchart illustrating example operation of the content-delivery system 10 shown in FIG. 1 in streaming content to a requesting client 60. The steps illustrated in FIG. 4 may be combined, modified, or deleted where appropriate, and additional steps may also be added to the flowchart. Additionally, the steps may be performed in any suitable order without departing from the scope of the invention.

Operation, in the illustrated example, begins at step 400 with appropriate components of system 10 receiving a request identifying or referencing a group of source files 70. For example, streamer 40 may receive a content request 90 for a plurality of source files 70 or a playlist associated with a group of source files 70 from the requesting client 60. In particular embodiments, the requesting client 60 requests these source files 70 by transmitting an HTTP request to server 50 that identifies the requested source files 70. The HTTP request may also specify information about the requesting client 60 and/or a requested target format so that the content can be modified in a manner appropriate for transmission to and display by the relevant client 60.

At step 402, streamer 40 determines a target format associated with the request. Streamer 40 may determine the target format for the requested media content based on the particular characteristics of client 60 or other appropriate considerations. The target format may represent a format that is appropriate for transmission to and playback by the requesting client 60. At step 404, streamer 40 determines whether the requested source files 70 are already stored or otherwise available in the target format. For example, in particular embodiments, streamer 40 may determine whether original content store 20 holds source files 70 that contain the requested content in the target format. If the requested content is already stored or available in the target format, operation proceeds to step 412 where streamer 40 retrieves the relevant source files 70 from an appropriate content store in the target format and operation moves to step 416.

If the requested content is not available in the target format, at step 406, streamer 40 transmits transcoding request 92 to transcoder 30. Transcoding request 92 indicates the requested content and the target format. At step 408, transcoder 30 retrieves source files 70 containing the requested content. At step 410, transcoder 30 begins modifying content in a first of the requested target files 70 and generating a corresponding target file 72a in the target format. Additionally, transcoder 30 also begins generating a first auxiliary file 80a associated with target file 72a at step 414. In particular embodiments, transcoder 30 may generate target file 72a and auxiliary file 80a contemporaneously.

Streamer 40 notifies the requesting client 60 that a first portion of target file 72a is available in the target format at step 416. In particular embodiments, streamer 40 may notify the requesting client 60 that a portion of the content in the target format is available by transmitting session information 82, such as an SDP message, to the requesting client 60 that describes parameters for the target files 72 created for this request. At step 418, streamer 40 receives a request from the requesting client 60 to begin transmission of a media stream containing content from the first target file 72a.

Streamer 40 may then begin transmitting the requested media content to the requesting client 60 as media stream 76. If streamer 40 attempts to transmit content from the relevant target file 72 while content is still being written to that target file 72, then streamer 40 may utilize a corresponding auxiliary file 80 to facilitate access to and transmission of the content in the relevant target file 72. In certain embodiments, streamer 40 may even utilize auxiliary files 80 when streaming from a completed target file 72. Alternatively, streamer 40 may be configured to use auxiliary files 80 only if streaming target files 72 that are still being transcoded and may not utilize auxiliary files 80 to stream content from completed target files 72.

In particular embodiments, streamer 40 accesses media information in auxiliary file 80 associated with a first portion of the first target file 72. For example, streamer 40 may access a first record of auxiliary file 80 storing media information for a first video frame of the first target file 72. Streamer 40 may then use this media information to determine the location of the corresponding first content portion in the first target file 72, read the first content portion from the determined location in target file 72, and transmit the first content portion to the requesting client 60 as part of media stream 76. This is represented in FIG. 4 by streamer 40 initiating transmission of modified content from the first target file 72 at step 420.

After streamer 40 begins transmitting media stream 76 to the requesting client 60, the requesting client 60 initiates playback of media stream 76 at step 422. Streamer 40 may continue to utilize media information in auxiliary file 80a to process and/or transmit content from the first target file 72. Because transcoder 30 makes media information (including auxiliary files 80) available to streamer 40 and/or clients 60 while transcoder is still modifying content from source files 70 to create target files 72, the requesting client 60 may begin playback of content from the first target file 72 before transcoder 30 has finished creating the first target file 72. Thus, in the illustrated example, transcoder 30 does not finish creating the first target file 72 until step 424.

Once streamer 40 finishes transmitting content from the first target file 72, streamer 40 may determine whether additional target files 72 remain to be transmitted, at step 424. If so, system 10 repeats steps 410-424 an additional time for each of the remaining target files 72. In doing so, streamer 40 transmits content from these remaining target files 72 to the requesting client 60.

Because transcoder 30 also makes media information associated with these additional target files 72 available while transcoder 30 is still finishing creation of these target files 72, streamer 40 may be able to provide content from the remaining target files 72 to the requesting client 60 in a seamless fashion as part of a single media stream, without any added breaks or pauses between content from the individual target files 72. As a result, a user of the requesting client 60 may be able to view content from all the media files in succession without having to provide any additional input to the requesting client 60.

Furthermore, in particular embodiments, transcoder 30 and/or streamer 40 may take additional steps to maintain temporal consistency between frames of the various target files 72, as described above. As a result, clients 60 may be unable to detect that they are receiving content from multiple different target files 72. Thus, in particular embodiments, common conventional media players may be used as clients 60 and may be capable of receiving and playing this multi-file media stream without any retrofitting or modification of hardware or software associated with the media players.

After completing the generation of all target files 72 for the received content request 90, transcoder 30 may, in particular embodiments, store target files 72 and/or auxiliary files 80a-c, as shown at step 428. Target files 72 and auxiliary file 80 may be stored indefinitely to fulfill any future requests for the same source files 70, cached temporarily and then discarded, or maintained in accordance with any other schedule or policies. Operation of system 10 with respect to delivering content requested by content request 90 may then end as shown in FIG. 5.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for processing media content, comprising:
receiving a request for media content from a client;
accessing a plurality of source files associated with the requested media content, wherein the plurality of source files comprise the media content in one or more source formats;
generating a plurality of target files based on the plurality of source files, wherein the plurality of target files comprises the media content in a target format;
generating an auxiliary file for each of the plurality of target files, each of the auxiliary files comprising a plurality of content records characterizing portions of a given target file of the plurality of target files, wherein each content record of an auxiliary file of the given target file characterizes:
a position of a respective portion of the media content in the target format in the given target file; and
an amount of media content dropped between the respective portion of the media content and another portion of the media content of the given target file, wherein the amount of media content dropped corresponds to an amount of video frames dropped between the respective and the other portion of the media content;
determining a portion of the plurality of target files to transmit to the client to satisfy the request for the media content based on generated auxiliary files;
calculating time-stamps for each of the video frames in the portion of the plurality of target files determined to be transmitted to the client to satisfy the request for the media content based at least on the amount of media content dropped and a frame rate associated with the target format; and
transmitting to the client as a seamless media transmission the portion of the plurality of target files without transmitting respective content records to the client.

2. The method of claim 1, wherein transmitting to the client the portion of the plurality of target files comprises streaming the portion of the plurality of target files to the client as a single, seamless media stream.

3. The method of claim 1, wherein each content record includes information to facilitate transmission of an associated portion of a corresponding target file of the plurality of target files to the client prior to the corresponding target file being completely generated.

4. The method of claim 1, wherein receiving a request for media content comprises:
   receiving, from the client, a request for the media content from a first media file; and
   identifying a second media file to be transmitted to the client with the first media file in response to receiving the request.

5. The method of claim 1, wherein:
   the plurality of source files include a first source file comprising the media content in a first source format, wherein the first source format is different from the target format; and
   generating the plurality of target files comprises:
      modifying media content in the first source file from the first source format to the target format; and
      writing the modified media content to a first target file associated with the first source file.

6. The method of claim 5, wherein the plurality of source files further include a second source file comprising the media content in the target format.

7. The method of claim 6, wherein the plurality of content records include at least one content record associated with the media content in the first target file and at least one content record associated with the media content in the second source file.

8. The method of claim 7, wherein transmitting to the client the portion of the plurality of target files comprises transmitting media content from the first target file and the second source file to the client as a seamless media transmission.

9. The method of claim 1, wherein each content record of the auxiliary file of the given target file further characterizes a size and a type of media content of the respective portion of the media content in the target format in the given target file, wherein the type of media content is at least one of audio or video content.

10. The method of claim 1, further comprising transmitting to the client the portion of the plurality of target files based on the calculated time-stamps such that the client receives the portion of the plurality of target files in a single seamless media transmission.

11. A system for processing media content, comprising:
   a transcoder comprising:
      a transcoder memory configured to store processor instructions;
      a transcoder processor configured to execute the processor instructions stored by the transcoder memory and, while executing the processor instructions, configured to:
         receive a request for media content from a client;
         access a plurality of source files associated with the requested media content, wherein the plurality of source files comprise the media content in one or more source formats;
         generate a plurality of target files based on the plurality of source files, wherein the plurality of target files comprises the media content in a target format; and
         generate an auxiliary file for each of the plurality of target files, each of the auxiliary files comprising a plurality of content records characterizing portions of a given target file of the plurality of target files, wherein each content record of an auxiliary file of the given target file characterizes:
            a position of a respective portion of the media content in the target format in the given target file; and
            an amount of media content dropped between the respective portion of the media content and another portion of the media content of the given target file, wherein the amount of media content dropped corresponds to an amount of video frames dropped between the respective and the other portion of the media content; and
   a streamer comprising:
      a streamer memory configured to store processor instructions; and
      a streamer processor configured to execute the processor instructions stored by the streamer memory to,
         determine a portion of the plurality of target files to transmit to the client to satisfy the request for the media content based on generated auxiliary files;
         calculate time-stamps for each of the video frames in the portion of the plurality of target files determined to be transmitted to the client to satisfy the request for the media content based at least on the amount of media content dropped and a frame rate associated with the target format; and
         transmit to the client as a seamless media transmission the portion of the plurality of target files without transmitting respective content records to the client.

12. The system of claim 11, wherein the streamer is configured to transmit the portion of the plurality of target files to the client by streaming the portion of the plurality of target files to the client as a single seamless media stream.

13. The system of claim 11, wherein each content record includes information to facilitate transmission of an associated portion of a corresponding target file of the plurality of target files to the client prior to the corresponding target file being completely generated.

14. The system of claim 11, wherein the transcoder is configured to receive a request for media content by:
   receiving, from the client, a request for the media content from a first media file; and
   identifying a second media file to be transmitted to the client with the first media file in response to receiving the request.

15. The system of claim 11, wherein the plurality of source files include a first source file comprising the media content in a first source format, wherein the first source format is different from the target format; and the transcoder is configured to generate the plurality of target files by:
   modifying media content in the first source file from the first source format to the target format; and
   writing the modified media content to a first target file associated with the first source file.

16. The system of claim 15, wherein the plurality of source files further include a second source file comprising the media content in the target format.

17. The system of claim 16, wherein the plurality of content records include at least one content record associated with the media content in the first target file and at least one content record associated with the media content in the second source file.

18. The system of claim 17, wherein the streamer that is configured to transmit to the client the portion of the plurality of target files comprises transmitting media content from the first target file and the second source file to the client as a seamless media transmission.

\* \* \* \* \*